Patented Sept. 23, 1941

2,257,083

UNITED STATES PATENT OFFICE 2,257,083

COMPOSITION OF MATTER

Malcolm R. Buffington, Millburn, N. J., assignor to Rubber Associates, Incorporated, a corporation of New York No Drawing. Application August 14, 1937, Serial No. 159,112

3 Claims. (Cl. 260—746)

This invention relates to a composition of matter and more particularly to a resilient composition which may be used for a large variety of purposes, for which plastic, resilient and rubber compositions are now commonly employed.

An object of the invention is to produce a composition particularly suited for molded parts particularly where it is desirable to mold these in situ.

Another object is to provide a composition particularly useful as a joining material in highway and other constructions where it is necessary to have a joining or filling material that will permit of expansion and contraction of the joined parts.

Other objects of the invention will be apparent from the following specification wherein by way of illustration the improved composition is shown as used to join adjacent sections of a highway. Such joints are commonly termed and hereinafter referred to as "expansion joints." It will be understood, however, that the invention is not limited to the use herein described but may be used for any other purpose for which it is suited and that various modifications can be made in the composition disclosed without departing from the appended claims.

It has heretofore been customary to make expansion joints and the like by inserting between the sections of the roadway, a slab or sheet of resilient compressible material, said slab or sheet being pre-molded. Various materials have been used for this purpose such as asphalt compounds, cork mixtures and rubber.

A typical expansion joint of the prior art is shown in U. S. Patent 1,960,369 to Bostwick, dated May 29, 1934, which discloses a filler strip of resilient cork composition having a length and depth equal to that of the paving sections and a thickness of three-fourths of an inch. Such a strip is formed (in an extrusion machine) of approximately two parts, by weight, of comminuted cork and one part of a synthetic resinous binder composed preferably of phenol, paraformaldehyde and diethylene glycol.

Such a cork strip may be positioned within the gap between sections of the pavement and then a fine textured concrete is poured into the space and allowed to set when the contraction has reached its minimum in the dead of winter, or asphaltum may be used. The supplemental filler, whatever is used, must be sufficiently plastic to permit expansion and contraction of the joint.

A satisfactory joint of this character should be water proof, oil proof and highly resistant to oxidation. It must be resistant to abrasion by granular inert materials. It must also withstand wear or abrasion by traffic passing over it and resilient enough to compress to 50% of its normal joint structure and be resilient enough to be extended 50% greater than the normal joint structure without separating from the surfaces to which it is joined.

When any pre-formed joint is employed, the main difficulty is to make such joint of such material as will have adhesion to the concrete sections and secondly to so unite said joint to the adjacent roadway surfaces that the expansion and contraction will not cause separation at these points.

The present invention eliminates the above difficulties in compositions of this general character. This improved composition need not be pre-formed in most instances but can be readily poured into a space which it is intended to fill or into a mold without substantial shrinkage in the finished product. If it is desired to permanently fill the cavity, the composition is easily and permanently attached to the walls thereof by any suitable means.

To obviate the difficulties encountered with premolded joints, poured joints comprising mixtures of Portland or slag cement with concentrated rubber latex as a binder have been used with fair results. However, even these have not produced an entirely satisfactory joint because the structure produced progressively hardens to such a degree that in the extended position the bond between the joint and the highway sections is destroyed, allowing water to seep in, or inert substances get into the base of the subgrade supporting the highway sections.

In order for an expansion joint to form an effective seal between road sections, it must be freely extensible and compressible without separating from the faces of the joint and without cracking in the body of the structure. It must also undergo this extension and compression without undue extrusion above the level of the road sections.

It is obvious to those familiar with the problems connected with highway construction that premolded materials used for expansion joints which extrude must be provided with a seal of some plastic material. These joints usually require considerable maintenance, especially after they have been subjected to compression caused by expansion of the road sections during hot weather and failure of the joint seal to follow the road sections during subsequent contraction.

A satisfactory joint sealing material should be resilient enough to follow the movement of the road sections during expansion and contraction periods without subjecting the bonding medium to any great amount of stress. It should also be of such character that pressure during the expansion of the roadway sections is taken up by the material without causing extrusion and at the same time return freely to its original shape during contraction.

The most satisfactory material for filling and sealing an expansion joint is one which can be readily handled without special equipment or skilled labor. The preferred form of material is one which can be poured from a container and which will readily adjust itself to a uniform level after pouring. Such a material should also become firm enough on the surface within a short time to withstand dilution by water, in case of rain or otherwise, and should become firm throughout within a few hours without substantial shrinkage so as to prevent undue delay in opening the highway to traffic and the deformation of the joint caused by abrasive substances resulting from such traffic.

In order to prevent extrusion in an expanded joint it has been found that some sort of filler must be used having a cell structure that is readily compressible. If the composition consists of a number of solid particles surrounded by an elastic material, it is important there be poor adhesion between the particles and the material (hereinafter called the binder) surrounding them in order to allow for free movement of the particles in the binder.

The elasticity of the material resulting from the evaporation of the water content of an aqueous dispersion of rubber is well known. However, such evaporation results in considerable shrinkage if the material is poured into a confined space even in dispersions of the highest solid content commercially available.

In order to prevent shrinkage of an aqueous dispersion of rubber or similar elastic material, some filler must be added which will almost exactly displace the volume of the water lost by evaporation.

In the choice of such filler, due consideration must be given to the fact that an aggregate of particles of different sizes controls shrinkage much better than particles of a uniform size. Using the preferred form of mica filler herein disclosed, the particles or pellets may be of various sizes from those $\frac{1}{40}$ inch square to those $\frac{1}{4}$ inch square by $\frac{5}{8}$ inch long. As the shape of these pellets is very irregular, it is difficult to give their exact proportion, or the proportion of small to large pellets, but this is easily determined by simple experiment and depends upon the use to which the material is to be put.

In practicing the present invention it has been found that expanded mica is an ideal filler to use in conjunction with an aqueous dispersion of rubber or similar elastic materials. Although the true specific gravity of unexpanded mica is 2.95, the apparent specific gravity of expanded mica the preferred form used, is approximately .25. On account of the irregular shape of the granules of expanded mica, they occupy a volume almost equivalent to the apparent specific gravity when mixed with a fluid medium.

Expanded mica granules consist of a series of plates held loosely together which do not disintegrate with ordinary agitation in a fluid medium. However, expanded mica granules can be easily subdivided into smaller particles when slight pressure is applied to the dry material.

Mica of the preferred form for carrying out this invention is known as "Zonolite." It is a natural mica which has been subjected to great heat, which has caused the laminae of the mica to expand. Such mica is commonly termed "expanded mica" and has been artificially produced by heating scrap mica under certain conditions. Such expanded mica material is commonly known as vermiculite.

Such expanded mica is light in weight and if made into granules, each granule is formed of a large number of laminate loosely associated or "expanded." Slight pressure will compact these laminae and greatly reduce the granule in thickness. Once compacted, the granule remains flattened as it has no resiliency. Such granules are not, therefore, expansible or resilient, and when compacted, split up, the laminae separating and being separately removable from the binder, which, while it surrounds them, only slightly adheres thereto.

Such expanded mica as described operates in an entirely different manner from fillers made of particles or pellets of mineral wool, asbestos, infusorial earth, cork, puffed rice, corn cobs, pithy matter and other substances which are compressible or partially so, and may be immersed in a coating such as latex and individually dried and then mixed in a binder such as asphalt or the like. Such pellets are also made up in sheet form by spreading them on a sheet and spraying them with latex; but such pellets always form a compressible and elastic sheet or the like (usually vulcanization is necessary) in which the pellets adhere together because of the latex, said pellets being resilient. The expanded mica used in the present invention has no resiliency nor are the granules of same held together by the binder. They are held in the binder, but adhere poorly to same, and can be easily brushed out of the binder when same is extended. The binder, therefore, may in itself form a sheet in which the mica granules are embedded, but it does not join the granules in a sheet nor coat each granule, the same being merely dispersed throughout the mass of the binder. The expanded mica does not form so called "rubberized pellets."

If a mixture is made comprising an aqueous dispersion of elastic material, such as rubber, and a filler consisting of irregular particles of material which can be subdivided with a slight pressure such as the expanded mica material just described, and the product is dried out the application of pressure by compression of the resulting product will result in the disintegration of the filler by which the pressure is partially absorbed. In order for this to operate satisfactorily there must be poor adhesion between the elastic material and the filler. I have found that expanded mica is best suited for this purpose although good results have been obtained with stearic acid coated Whiting or chlorinated rubber.

In formulating a filler for use in connection with an aqueous dispersion of an elastic material for use in sealing of expansion joints, it is impossible to displace all of the water in the aqueous dispersion by filler and still have a mixture which will pour readily. Consequently, some material must be added with the filler which will not have any immediate effect on the fluidity of the mixture but will gradually increase in volume. A material which operates satisfactorily in this connection is bentonite.

Bentonite has the property of being more fluid when mixed with an alkaline solution than it is in acid solution. Since most aqueous dispersions of elastic material commercially available are alkaline in reaction, an addition of bentonite to them, particularly in proportions of 1% or 2%, has no great effect on the fluidity. However, if a material is added with the bentonite, such as basic aluminum acetate or sodium silica fluoride, the gradual reduction of the alkalinity of the dispersions by release of acid ions from the aforesaid material causes a decided thickening of the mixture. In a preferred formula for a filler powder which is to be mixed with an aqueous dispersion of rubber, compounding materials such as sulphur, zinc oxide, accelerator and antioxidants are advisable in order to cause a gradual vulcanization of the rubber content in the mixture and to resist the action of the elements.

A formula which has been found to be satisfactory for the purposes hereindescribed is as follows by weight:

| | |
|---|---|
| Sulphur | .5 |
| Zinc oxide | .5 |
| Accelerator | .5 |
| Antioxidant | .5 |
| Basic aluminum acetate | .3 |
| Bentonite | 1.2 |
| Expanded mica | 20 |

To obtain an elastic compressible product from a mixture of the above formula and an aqueous dispersion of rubber, equal parts by volume of the powder and liquid are gradually stirred together and the mixture poured into a confined space. Within a short time after pouring this mixture, the product will resist dilution with water and within a few hours it will become firm throughout without substantial shrinkage. The mixture may be removed from the form and maybe vulcanized in an oven by hot air or allowed to remain at normal temperature until vulcanized.

It will be readily understood by those skilled in the art that the amount of acid releasing substances added to this formula is not sufficient to completely coagulate the aqueous dispersion used. The bentonite in the formula is not sufficient to absorb all of the water present in the aqueous dispersion. The solidification of this product results from the gradual filtering out of the water content of the aqueous dispersion, partial absorption of water by the bentonite which is accelerated by the reduction in the alkalinity of the dispersion and some precipitation of insoluble compounds caused by the action of the aluminum ion on the protective agent of the dispersion. This latter effect is not particularly important, however, because satisfactory results have been obtained by the use of acid releasing compounds which do not contain aluminum ions.

A preferred type of aqueous rubber dispersion which has been found to produce an exceptionally elastic product when used as above described is a mixture of 50% natural rubber latex and 50% of an artifically prepared aqueous dispersion of reclaimed rubber. Such a mixture while particularly desirable for the purposes enumerated, has a tendency to coagulate in storage. I have found that this mixture may be stabilized satisfactorily by the addition of from ½% to 2% of urea or ½% of a condensation product of a water insoluble organic compound having at least one reactive hydroxyl, carboxyl or amino group and an organic compound having at least four ethanoxy groups. An example could be formed by a condensation of octa methyl glycol and ethylene oxide and is commercially available as Emulfor O. These stabilizers can be added without interfering with the formation of a firm structure when the filler powder is added to the liquid. Stabilization of such mixtures with caustic alkalies is to be avoided because it interferes with the normal reaction of the bentonite in the filler powder.

What is claimed is:

1. A plastic composition of matter comprising aqueous dispersion of rubber, a filler of discrete masses of friable particles containing mainly expanded mica and bentonite in amount by volume equal substantially to the volume of the aqueous rubber dispersion, the proportion of mica to bentonite being in the neighborhood of 20 to 1, and a coagulant for the rubber dispersion.

2. A plastic composition of matter adapted to be poured into a mold comprising an aqueous dispersion of rubber, a filler powder containing mainly expanded mica in amount by volume equal substantially to the volume of said aqueous rubber dispersion and bentonite in amount of about 1 to 2 percent by weight of the said aqueous rubber dispersion, and a coagulant for the rubber dispersion.

3. A plastic composition of matter adapted to be poured into a mold comprising an aqueous dispersion of rubber admixed with a substantially equal volume of a filler of discrete friable particles composed mainly of expanded mica, bentonite and a coagulating agent in proportions by weight respectively of about 20 to 1 to .3.

MALCOLM R. BUFFINGTON.